United States Patent
Sasaki et al.

(10) Patent No.: US 8,138,296 B2
(45) Date of Patent: Mar. 20, 2012

(54) EPOXY COMPOUNDS AND PROCESS FOR THEIR PRODUCTION

(75) Inventors: Nobutoshi Sasaki, Kawasaki (JP); Toshio Fujita, Kawasaki (JP); Hiroshi Uchida, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 562 days.

(21) Appl. No.: 12/300,265

(22) PCT Filed: May 30, 2007

(86) PCT No.: PCT/JP2007/061398
§ 371 (c)(1), (2), (4) Date: Nov. 10, 2008

(87) PCT Pub. No.: WO2007/142248
PCT Pub. Date: Dec. 13, 2007

(65) Prior Publication Data
US 2009/0182110 A1 Jul. 16, 2009

(30) Foreign Application Priority Data
Jun. 7, 2006 (JP) ................................ 2006-158713

(51) Int. Cl.
*C08G 77/12* (2006.01)
(52) U.S. Cl. .......................................... 528/31; 528/27
(58) Field of Classification Search .................... 528/31, 528/27
See application file for complete search history.

(56) References Cited

U.S. PATENT DOCUMENTS

| | | | |
|---|---|---|---|
| 3,369,055 A | 2/1968 | Salyer et al. | |
| 3,450,711 A | 6/1969 | Megna et al. | |
| 3,558,741 A * | 1/1971 | Holub et al. | 525/102 |
| 4,582,886 A | 4/1986 | Ryang | |
| 5,180,627 A | 1/1993 | Inoue et al. | |
| 5,206,328 A | 4/1993 | Okamura et al. | |
| 6,080,872 A | 6/2000 | Pirola et al. | |

FOREIGN PATENT DOCUMENTS
CN 1 880 322 * 12/2006

OTHER PUBLICATIONS

Tao et al. "Synthesis and characterization of imide ring and siloxane-containing cycloaliphatic epoxy resins" Eur. Polymer Journal, 43 (2007) 1470-1479.*
CN 1 880 322 Abstract (Dec. 2006).*
Cai, et al., "Synthesis of terminal Si-H irregular tetra-branched star polysiloxanes. PT-catalyzed hydrosilylation with unsaturated epoxides. Polysiloxane films by photo-acid catalyzed crosslinking," Polymer, 2004, p. 2941-2948, vol. 45, XP-004499260.
Jia, et al., "A Novel Approach to Interpenetrating Networks of Epoxy Resin and Polydimethylsiloxane," Journal of Applied Polymer Science, 2007, p. 2663-2669, vol. 105, XP-002455213.

* cited by examiner

*Primary Examiner* — Kuo-Liang Peng
(74) *Attorney, Agent, or Firm* — Sughrue Mion, PLLC

(57) ABSTRACT

Novel epoxy compounds represented by the general formula:

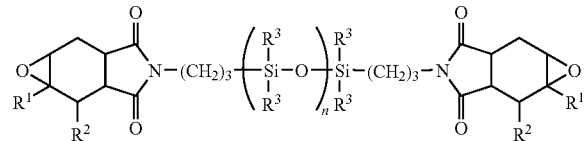

(wherein $R^1$ and $R^2$ each represent hydrogen, a C1-6 alkyl group or a C1-4 trialkylsilyl group, each $R^3$ may be the same or different and each independently represents hydrogen, alkyl, aryl, aralkyl, alkenyl or fluoroalkyl, and n is 0 or a positive integer), and the general formula:

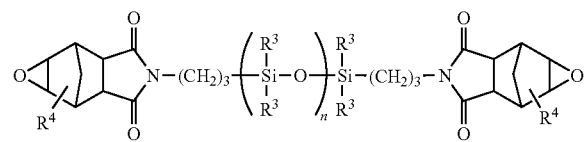

(wherein $R^3$ represents the same groups specified above, $R^4$ represents hydrogen, a C1-6 alkyl group or a C1-4 trialkylsilyl group, and n is 0 or a positive integer), and a process for their production.

11 Claims, 3 Drawing Sheets

EPOXY COMPOUNDS AND PROCESS FOR THEIR PRODUCTION

TECHNICAL FIELD

The present invention relates to novel epoxy compounds that are useful as starting materials such as sealing materials, molding materials, casting materials, laminating materials, composite materials, adhesives and powder coatings that are used for electrical, electronic and optical parts, as well as to a process for their production.

BACKGROUND ART

Epoxy compounds are used in a wide range of fields as sealing materials, molding materials, casting materials, laminating materials, composite materials, adhesives and powder coatings for electrical/electronic/optical parts, because their curing with various curing agents yields cured products with excellent mechanical properties, humidity resistance and electrical properties. With continuing advances in techniques, it has become a requirement for epoxy compounds to exhibit high performance in terms of heat resistance and the like.

Improvement in heat resistance by using N-(2,3-epoxypropyl)perhydro-4,5-epoxy phthalimide having an imide structure has already been proposed (R Antoni et al., Makromol. Chem., 194, 411 (1993)), but since the process described therein employs epichlorhydrin during production steps for the intermediate it is impossible to avoid inclusion of halogen residue in the final product, and therefore the process is not desirable as a process for production of products which are intended to be used as electronic materials requiring minimal halogen residue.

On the other hand, as organopolysiloxanes with epoxy group-containing organic groups there have been proposed organopolysiloxanes or cyclic siloxanes having 3-glycidoxypropyl groups or 2-(3,4-epoxycyclohexyl)ethyl groups on molecular chain ends or molecular chain side-chains (see Japanese Unexamined Patent Publication HEI No. 3-255130).

DISCLOSURE OF THE INVENTION

However, the need still exists to provide novel epoxy compounds that are useful for starting materials such as sealing materials, molding materials, casting materials, laminating materials, composite materials, adhesives and powder coatings that are used for electrical, electronic and optical parts.

As a result of much diligent research aimed at meeting this need, the present inventors have discovered novel epoxy compounds represented by the following general formula:

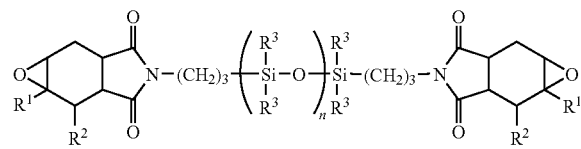

(wherein $R^1$ and $R^2$ each represent hydrogen, a C1-6 alkyl group or a C1-4 trialkylsilyl group, each $R^3$ may be the same or different and each independently represents hydrogen, alkyl, aryl, aralkyl, alkenyl or fluoroalkyl, and n is 0 or a positive integer), and the following general formula:

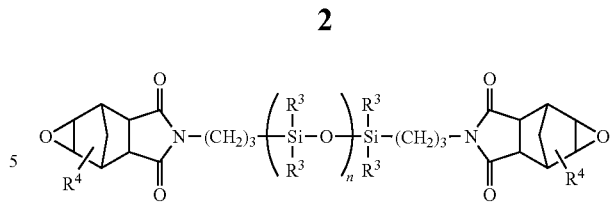

(wherein $R^3$ represents the same groups specified above, $R^4$ represents hydrogen, a C1-6 alkyl group or a C1-4 trialkylsilyl group, and n is 0 or a positive integer).

Specifically, the present invention provides the following [1]-[11].

[1] An epoxy compound represented by general formula (I):

$$\text{(I)}$$

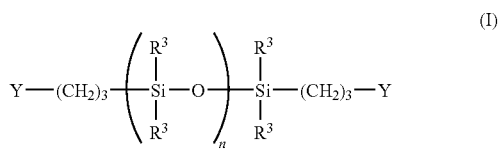

(wherein Y is represented by the following formula:

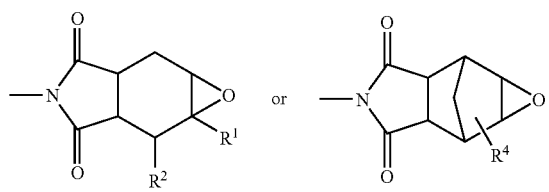

and $R^1$, $R^2$, $R^3$, $R^4$ and n are as defined above).

[2] An epoxy compound according to [1] above, wherein $R^1$ and $R^2$ are hydrogen, or $R^1$ is methyl, ethyl, propyl, isopropyl, tertiary butyl, trimethylsilyl, triethylsilyl or tertiary butyldimethylsilyl and $R^2$ is hydrogen, or $R^1$ is hydrogen and $R^2$ is methyl, ethyl, propyl, isopropyl, tertiary butyl, trimethylsilyl, triethylsilyl or tertiary butyldimethylsilyl.

[3] An epoxy compound according to [1] above, wherein $R^4$ is hydrogen or $R^4$ is methyl, ethyl, propyl, isopropyl, tertiary butyl, trimethylsilyl, triethylsilyl or tertiary butyldimethylsilyl.

[4] A process for production of an epoxy compound according to [1] or [2] above, characterized by reacting an olefin compound represented by the following general formula (II):

$$\text{(II)}$$

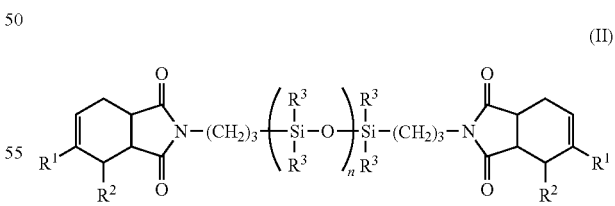

(wherein $R^1$, $R^2$, $R^3$ and n are as defined above) with a peroxide.

[5] A process for production of an epoxy compound according to [4] above, wherein in general formula (II), $R^1$ and $R^2$ are hydrogen, or $R^1$ is methyl, ethyl, propyl, isopropyl, tertiary butyl, trimethylsilyl, triethylsilyl or tertiary butyldimethylsilyl and $R^2$ is hydrogen, or $R^1$ is hydrogen and $R^2$ is methyl, ethyl, propyl, isopropyl, tertiary butyl, trimethylsilyl, triethylsilyl or tertiary butyldimethylsilyl.

[6] A process for production of an epoxy compound according to [1] or [2] above, characterized by reacting an epoxy compound represented by the following general formula (III):

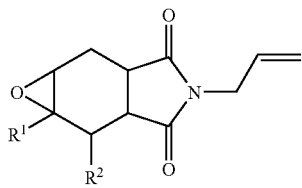

(III)

(wherein $R^1$ and $R^2$ are as defined above) with a silicon compound represented by the following general formula (IV):

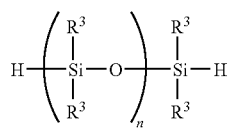

(IV)

(wherein $R^3$ and n are as defined above).

[7] A process for production of an epoxy compound according to [6] above, wherein in general formula (III), $R^1$ and $R^2$ are hydrogen, or $R^1$ is methyl, ethyl, propyl, isopropyl, tertiary butyl, trimethylsilyl, triethylsilyl or tertiary butyldimethylsilyl and $R^2$ is hydrogen, or $R^1$ is hydrogen and $R^2$ is methyl, ethyl, propyl, isopropyl, tertiary butyl, trimethylsilyl, triethylsilyl or tertiary butyldimethylsilyl.

[8] A process for production of an epoxy compound according to [1] or [3] above, characterized by reacting an olefin compound represented by the following general formula (V):

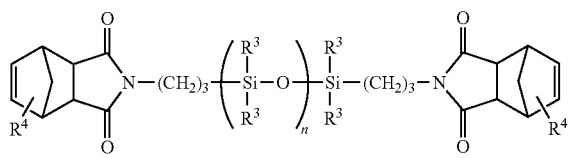

(V)

(wherein $R^3$, $R^4$ and n are as defined above) with a peroxide.

[9] A production process according to [8] above, wherein in general formula (V), $R^4$ is hydrogen or $R^4$ is methyl, ethyl, propyl, isopropyl, tertiary butyl, trimethylsilyl, triethylsilyl or tertiary butyldimethylsilyl.

[10] A process for production of an epoxy compound according to [1] or [3] above, characterized by reacting an epoxy compound represented by general formula (VI):

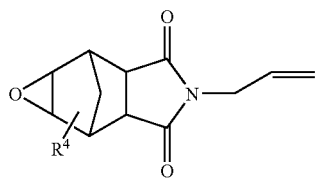

(VI)

(wherein $R^4$ is as defined above) with a silicon compound represented by the following general formula (IV):

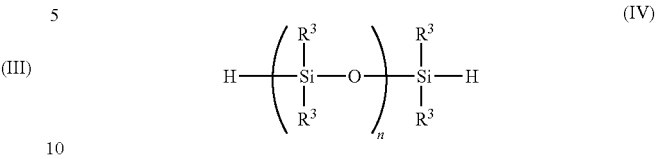

(IV)

(wherein $R^3$ and n are as defined above).

[11] A production process according to [10] above, wherein in general formula (VI), $R^4$ is hydrogen or $R^4$ is methyl, ethyl, propyl, isopropyl, tertiary butyl, trimethylsilyl, triethylsilyl or tertiary butyldimethylsilyl.

The novel epoxy compounds of the invention are useful in a wide range of application fields including sealing materials, molding materials, casting materials, laminating materials, composite materials, adhesives and powder coatings that are used for electrical, electronic and optical parts.

BEST MODE FOR CARRYING OUT THE INVENTION

Figure 1:
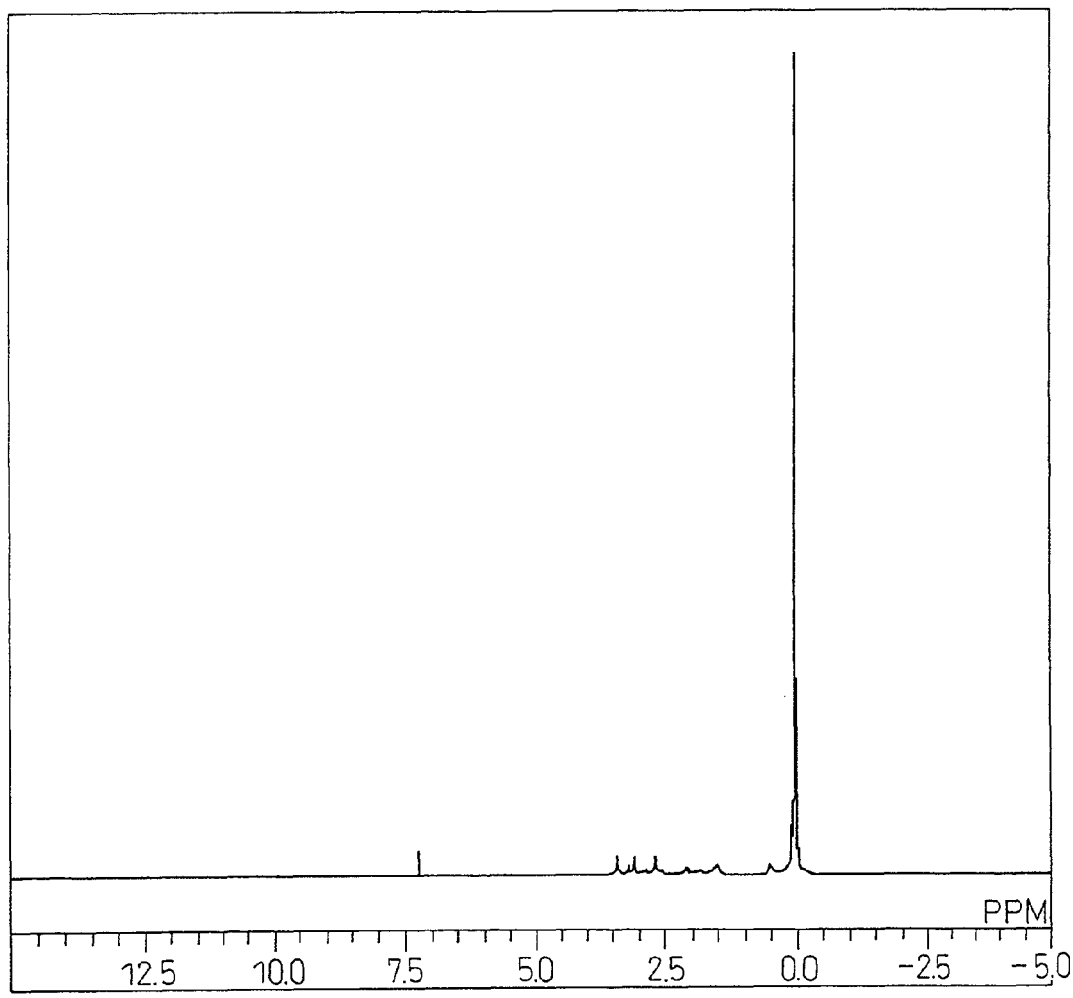
FIG. 1 is a chart showing a $^1$H-NMR spectrum for the epoxy compound represented by formula (IX) obtained in Example 1.

Preferred modes of the invention will now be explained in detail with the understanding that the invention is not limited only to these modes, and various modifications may be implemented such as are within the spirit and scope of the invention.

Specific examples of $R^1$ according to the invention include hydrogen, methyl, ethyl, propyl, isopropyl, butyl, isobutyl, tertiary butyl, pentyl, hexyl, trimethylsilyl, triethylsilyl and tertiary butyldimethylsilyl, although there is no restriction to these. $R^1$ is more preferably hydrogen, methyl, trimethylsilyl or tertiary butyldimethylsilyl.

Specific examples of $R^2$ include hydrogen, methyl, ethyl, propyl, isopropyl, butyl, isobutyl, tertiary butyl, pentyl, hexyl, trimethylsilyl, triethylsilyl and tertiary butyldimethylsilyl, although there is no restriction to these. $R^2$ is more preferably hydrogen, methyl, trimethylsilyl or tertiary butyldimethylsilyl.

Specific examples of $R^3$ include alkyl groups such as hydrogen, methyl, ethyl, propyl and butyl, aryl groups such as phenyl, tolyl and xylyl, aralkyl groups such as benzyl and phenethyl, alkenyl groups such as vinyl, allyl, butenyl, pentenyl and hexenyl and fluoroalkyl groups such as 3,3,3-trifluoropropyl, although there is no restriction to these. $R^3$ is more preferably hydrogen, methyl or 3,3,3-trifluoropropyl.

The letter n is preferably an integer of 1-500.

Specific examples of $R^4$ include hydrogen, methyl, ethyl, propyl, isopropyl, butyl, isobutyl, tertiary butyl, pentyl, hexyl, trimethylsilyl, triethylsilyl and tertiary butyldimethylsilyl, although there is no restrictions to these. $R^4$ is more preferably hydrogen, methyl, trimethylsilyl or tertiary butyldimethylsilyl.

A novel epoxy compound represented by general formula (I) according to the invention may be produced by reacting an olefin compound represented by general formula (II) or general formula (V) with a peroxide.

Any industrial used peroxides are suitable for use without any exceptions, and as examples there may be mentioned hydrogen peroxide and alkyl peroxides such as performic acid, peracetic acid, 3-chloroperoxybenzoic acid, cumene peroxide and dimethyldioxirane. Preferred peroxides are hydrogen peroxide, peracetic acid and 3-chloroperoxybenzoic acid, with hydrogen peroxide and peracetic acid being more preferred.

When hydrogen peroxide is used as the peroxide, there is no particular restriction on the hydrogen peroxide water concentration, and reaction with the olefin compound occurs in a concentration-dependent manner, but the concentration will generally be selected in the range of 1-80% and preferably 20-60%.

The amount of the aqueous hydrogen peroxide solution used is not particularly restricted and reaction with the olefin compound occurs in a manner dependent on the amount used, but the concentration will generally be in the range of 0.8-10.0 equivalents and preferably 1.0-3.0 equivalents with respect to the olefin compound.

In the oxidation reaction with hydrogen peroxide, the reaction may be carried out in the presence of a quaternary ammonium hydrogensulfate and a catalytic amount of a Group 6 metal compound, such as molybdenum or tungsten.

As examples of quaternary ammonium hydrogensulfates there may be mentioned tetrahexylammonium hydrogensulfate, tetraoctylammonium hydrogensulfate, methyltrioctylammonium hydrogensulfate, tetrabutylammonium hydrogensulfate, ethyltrioctylammonium hydrogensulfate and cetylpyridinium hydrogensulfate, among which tetrahexylammonium hydrogensulfate, tetraoctylammonium hydrogensulfate and methyltrioctylammonium hydrogensulfate are preferred. These quaternary ammonium hydrogensulfates may be used alone or in combinations of two or more. The amount thereof used is selected within the range of preferably 0.0001-10 mol % and more preferably 0.01-5 mol % with respect to the olefin compound substrate.

As Group 6 metal compounds there may be mentioned, for example in the case of molybdenum, compounds that produce molybdate anion in water, and examples thereof include molybdic acid, molybdenum trioxide, molybdenum trisulfide, molybdenum hexachloride, phosphomolybdic acid, ammonium molybdate, potassium molybdate dihydrate and sodium molybdate dihydrate, among which molybdic acid, molybdenum trioxide and phosphomolybdic acid are preferred. In the case of tungsten, there may be mentioned compounds that produce tungstate anion in water, and examples thereof include tungstic acid, tungsten trioxide, tungsten trisulfide, tungsten hexachloride, phosphotungstic acid, ammonium tungstate, potassium tungstate dihydrate and sodium tungstate dihydrate, among which tungstic acid, tungsten trioxide, phosphotungstic acid and sodium tungstate dihydrate are preferred. These Group 6 metal compounds may be used alone or in combinations of two or more. The amount thereof used is selected within the range of preferably 0.0001-20 mol % and more preferably 0.01-10 mol % with respect to the olefin compound substrate.

Such catalysts may also be modified by using additives such as phosphoric acid, polyphosphoric acid, aminomethylphosphonic acid and sodium phosphate.

In a production process by oxidation reaction with hydrogen peroxide, the reaction will usually be carried out in the range of 30-100° C. and preferably in the range of 50-90° C.

When peracetic acid is used as the peroxide, there are no particular restrictions on the concentration of the peracetic acid in the acetic acid solution, but generally it will be selected within a range of 1-80% and preferably 9-40%. There are also no particular restrictions on the amount of acetic acid solution containing the peracetic acid, but generally it will be selected within a range of 0.8-10.0 equivalents and preferably 1.0-2.0 equivalents with respect to the olefin compound.

The oxidation reaction with an acetic acid solution containing the peracetic acid may be carried out without a solvent or with a solvent. The solvent selected may be any one that can accomplish dissolution, and specifically there may be used hexane, heptane, octane, decane, ethyl acetate, toluene, xylene, chloroform, dichloromethane, dichloroethane, tetrachloroethane and optional mixtures thereof as necessary, while the reaction may also be carried out in air or in an inert gas atmosphere such as nitrogen or argon.

The olefin compounds represented by general formula (II) and general formula (V) which are precursors for the novel epoxy compounds of the invention may be obtained by imidation reaction from the corresponding acid anhydride and a diamine. The solvent used for the reaction may be xylene, or toluene, metaxylene, orthoxylene, paraxylene, mesitylene or any desired mixture thereof as necessary, while the reaction may be carried out in air or in an inert gas atmosphere such as nitrogen or argon. The reaction may be conducted with additives such as polymerization inhibitors as well.

A novel epoxy compound represented by general formula (I) according to the invention may be produced by reacting an epoxy compound represented by general formula (III) or general formula (VI) with a silicon compound represented by general formula (IV).

This hydrosilylation reaction may be carried out in the presence of a catalyst, where the catalyst used is a publicly known addition reaction catalyst, for example, a platinum-based catalyst such as platinic chloride, and the reaction is accomplished by heating in the presence of the catalyst. The proportion of both compounds in the reaction between the epoxy compound represented by general formula (III) or general formula (VI) and the silicon compound represented by general formula (IV) may generally be in the range of 0.001-1.5 and preferably in the range of 0.005-1 —SiH groups in the silicon compound, with respect to 1 alkyl group in the epoxy compound.

The hydrosilylation reaction is preferably carried out by heating to 60-140° C. in an inactive solvent such as benzene, toluene or methyl isobutyl ketone. The amounts of such solvents will usually be 30-400 wt % and preferably 50-300 wt % with respect to the total weight of the epoxy compound of general formula (III) or general formula (VI) and the silicon compound of general formula (IV). The reaction time will normally be 1-24 hours, and preferably 2-10 hours. Upon completion of the reaction, the solvent may be distilled off while heating under reduced pressure to obtain a novel epoxy compound according to the invention.

The product obtained by the process described above may be purified by any ordinary method. For example, there may be specifically mentioned adsorption removal of the impurities and discoloring substances using an adsorbent such as active carbon, acidic white clay or active white clay, or column chromatography or thin-layer chromatography, and particularly column chromatography using silica gel, hydrous silica gel, alumina, active carbon, titania or zirconia, and especially silica gel, hydrous silica gel or alumina, as the filler. Purification may also be accomplished by distillation, and specifically vacuum distillation or molecular distillation.

The present invention will now be described in greater detail by examples, with the understanding that the invention is not limited to these examples.

REFERENCE EXAMPLE 1

In a 300 ml three-necked flask equipped with a reflux condenser, thermometer, Dean-Stark water separator, stirrer, dropping funnel and oil bath there were charged 1.675 g of cis-4-cyclohexene-1,2-dicarboxylic anhydride and 146.0 g of xylene. After heating to 70° C. while stirring in a nitrogen atmosphere to prepare a uniform solution, a total of 41.05 g of the silicon compound represented by the following formula (VII):

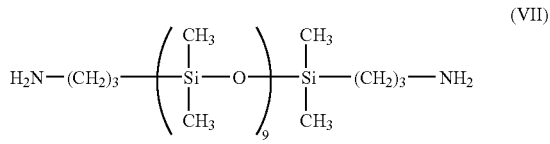

was added dropwise over a period of 20 minutes through a dropping funnel and the mixture was aged for 30 minutes, after which the oil bath was heated to 160° C. and the Dean-Stark water separator was used for heating to reflux for 24 hours while removing the captured water, and the mixture was cooled to room temperature.

A rotary evaporator was used to remove the solvent from the contents of the flask, and then purification was performed by column chromatography to obtain 52.14 g of the olefin compound represented by the following formula (VIII):

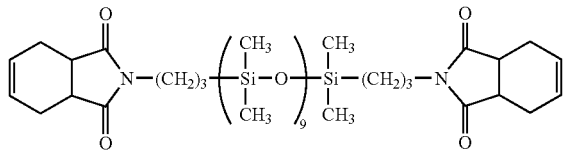

as a faint yellow transparent liquid.

REFERENCE EXAMPLE 2

In a 1 L four-necked flask equipped with a reflux condenser, thermometer, stirrer, dropping funnel and oil bath there were charged 304.3 g of cis-4-cyclohexene-1,2-dicarboxylic anhydride and 280 g of toluene. To this there was added dropwise a total of 116.5 g of allylamine over a period of 90 minutes using a dropping funnel in a nitrogen atmosphere, and after aging for 30 minutes, a Dean-Stark water separator was mounted on the separable flask and an oil bath kept at 140° C. was used for heating to reflux for 5 hours while removing the captured water, after which the mixture was cooled to room temperature.

A rotary evaporator was used to remove the solvent from the contents of the flask to obtain 344.3 g of a N-allyl-4-cyclohexene-1,2-dicarboxy crude product. This was purified by vacuum distillation to obtain 273.5 g of N-allyl-4-cyclohexene-1,2-dicarboximide as a colorless transparent liquid.

In a 50 ml three-necked flask equipped with a reflux condenser, thermometer, stirrer, dropping funnel and oil bath there were charged 100.0 g of N-allyl-4-cyclohexene-1,2-dicarboximide, 2.44 g of methyltrioctylammonium hydrogensulfate, 3.45 g of sodium tungstate dihydrate and 0.58 g of aminomethylphosphonic acid. The mixture was heated using an oil bath kept at 90° C., and after adding 80 ml of 30% hydrogen peroxide water dropwise over a period of 180 minutes through a dropping funnel, the mixture was aged for 4 hours. After cooling with an ice bath and removing the excess hydrogen peroxide with 300 ml of saturated aqueous sodium thiosulfate, extraction was performed twice with 200 ml of ethyl acetate. The obtained ethyl acetate solution was dried overnight over anhydrous sodium sulfate, and a rotary evaporator was used to remove the ethyl acetate solvent, after which purification was performed with a chromatography column packed with 25% hydrous silica gel to obtain 78.9 g of 4,5-epoxy-N-allylcyclohexane-1,2-dicarboximide.

EXAMPLE 1

In a 200 ml three-necked flask equipped with a reflux condenser, thermometer, stirrer, dropping funnel and oil bath there were charged 17.5 g of the olefin compound represented by formula (VIII) obtained in Reference Example 1 and 10 ml of ethyl acetate.

An oil bath kept at 60° C. was used for heating, and then 12.0 g of 40% peracetic acid was added dropwise over a period of 1 hour with a dropping funnel and the mixture was aged for 1 hour. The temperature of the oil bath was then raised to 70° C. and aging was continued for 1 hour. After cooling with an ice bath and removing the excess peracetic acid with 15 ml of saturated aqueous sodium thiosulfate, extraction was performed three times with 25 ml of ethyl acetate. The obtained ethyl acetate solution was dried overnight over anhydrous sodium sulfate, and a rotary evaporator was used to remove the ethyl acetate solvent, after which purification was performed by column chromatography to obtain 18.3 g of the epoxy compound represented by the following formula (IX).

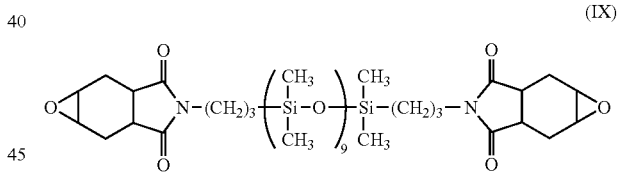

Figure 2:
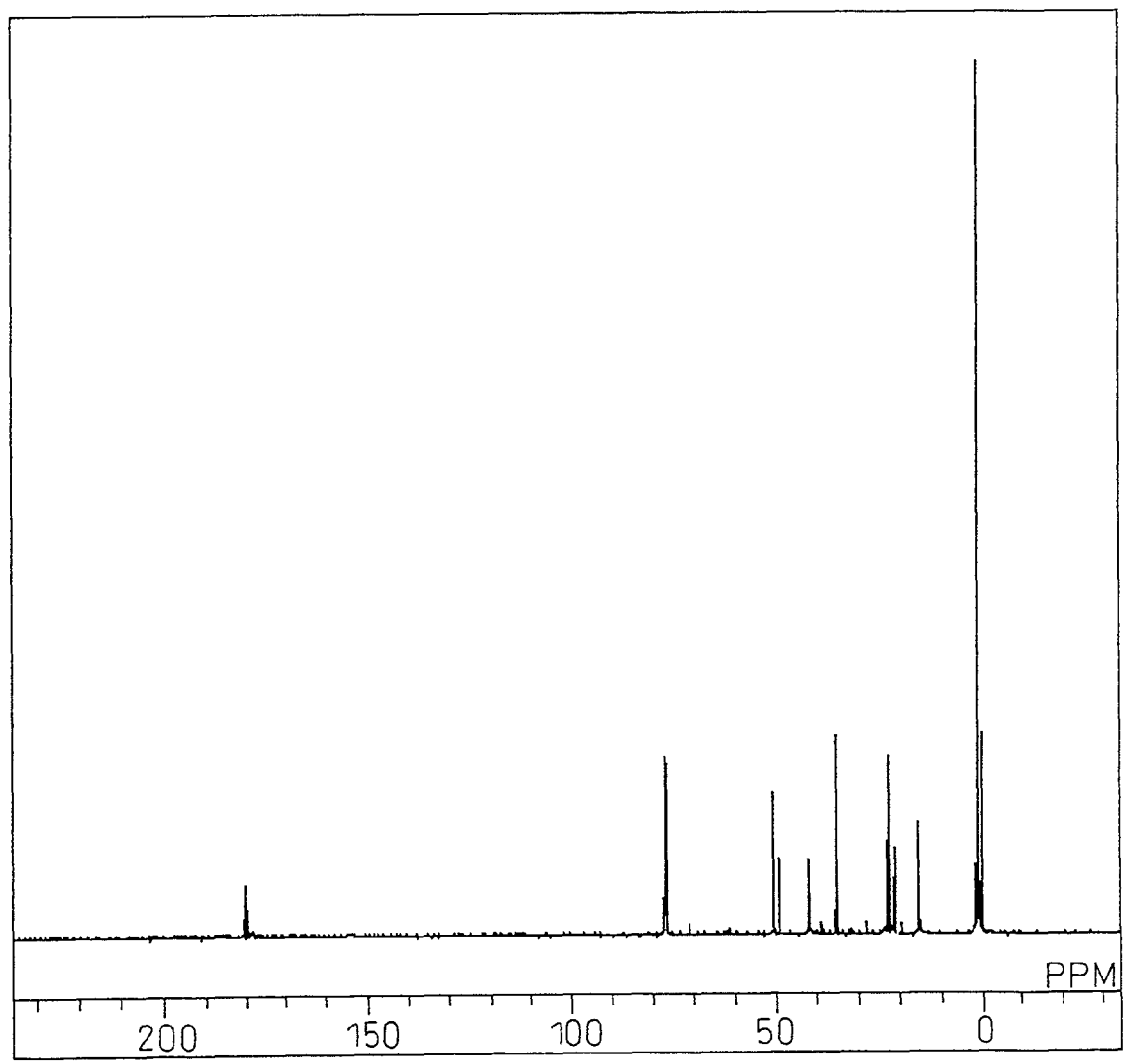
FIG. 2 is a chart showing a $^{13}$C-NMR spectrum for the epoxy compound represented by formula (IX) obtained in Example 1.
Figure 3:
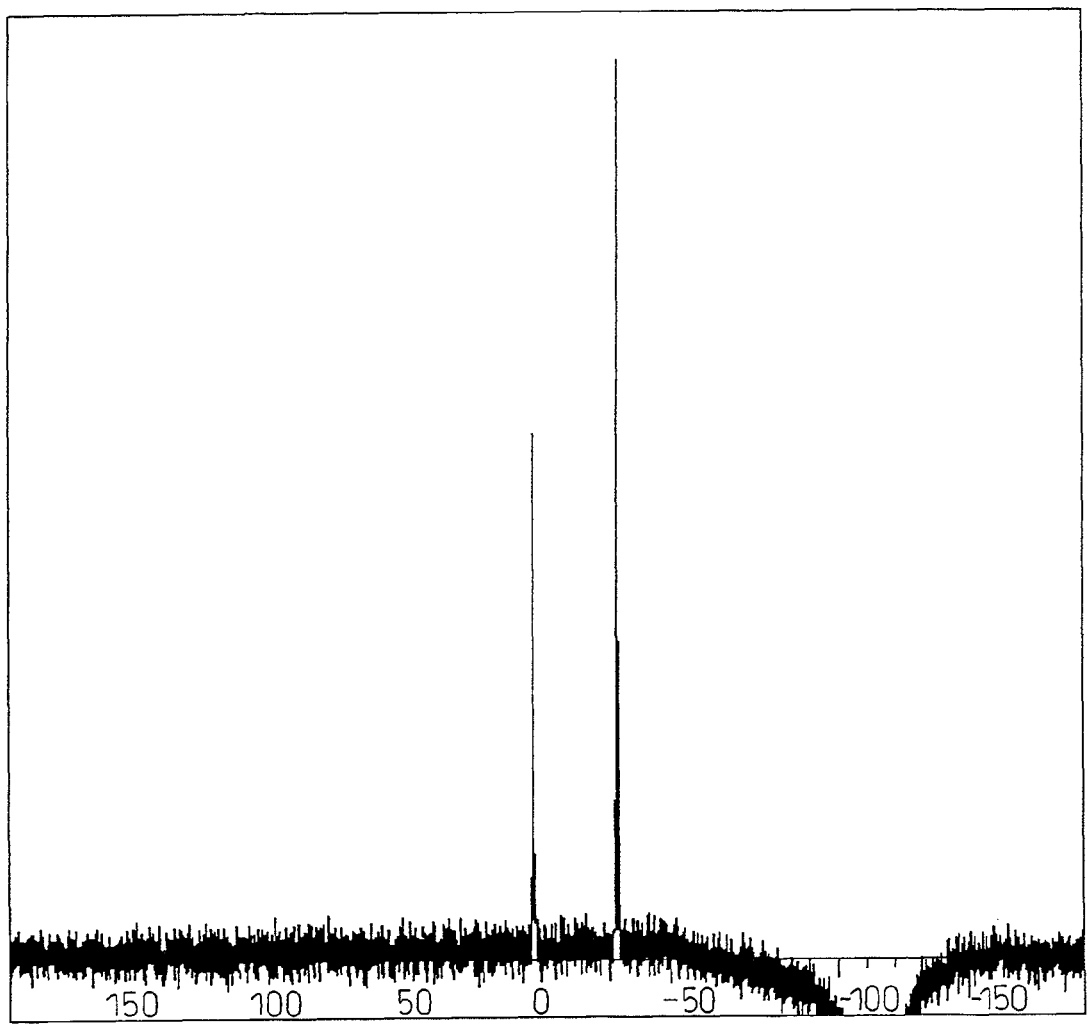
FIG. 3 is a chart showing a $^{29}$Si-NMR spectrum for the epoxy compound represented by formula (IX) obtained in Example 1.

An AL-400 nuclear magnetic resonance apparatus by JEOL Corp. was used for $^1$H-NMR, $^{13}$C-NMR and $^{29}$Si-NMR measurement of the epoxy compound in a heavy chloroform solvent, allowing confirmation of the structure shown above. The $^1$H-NMR, $^{13}$C-NMR and $^{29}$Si-NMR spectra of the epoxy compound represented by formula (IX) are shown in FIG. 1, FIG. 2 and FIG. 3.

EXAMPLE 2

In a 300 ml four-necked flask equipped with a reflux condenser, Dean-Stark water separator, thermometer, stirrer, dropping funnel and oil bath there were charged 22.8 g of the 4,5-epoxy-N-allylcyclohexane-1,2-dicarboximide obtained in Reference Example 2, 180 g of toluene and 0.05 g of a 2-ethylhexanol solution containing 2 wt % platinic chloride, after which the oil bath kept at 140° C. was used for azeotropic dewatering while circulating for 1 hour, and after confirming lack of water runoff, a total of 36.3 g of the silicon compound represented by the following formula (X):

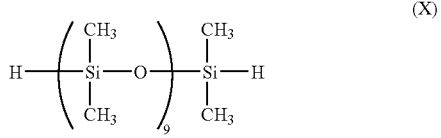

(X)

was added dropwise over a period of 30 minutes using a dropping funnel. The mixture was heated to reflux for 4 hours and then cooled to room temperature. After removing the catalyst by washing with water three times, a rotary evaporator was used for thorough removal of the solvent and purification was performed by column chromatography to obtain 40.2 g of the epoxy compound represented by formula (IX).

An AL-400 nuclear magnetic resonance apparatus by JEOL Corp. was used for $^{1}$H-NMR, $^{13}$C-NMR and $^{29}$Si-NMR measurement of the epoxy compound in a heavy chloroform solvent, yielding spectra similar to Example 1 and allowing confirmation of the structure of formula (IX) for the epoxy compound.

INDUSTRIAL APPLICABILITY

The novel epoxy compounds of the invention are useful in a wide range of fields including sealing materials, molding materials, casting materials, laminating materials, composite materials, adhesives and powder coatings that are used for electrical, electronic and optical parts.

The invention claimed is:

1. An epoxy compound represented by the following general formula (I):

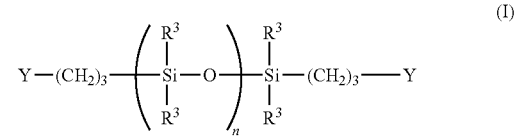

(I)

(wherein Y is represented by the following formula:

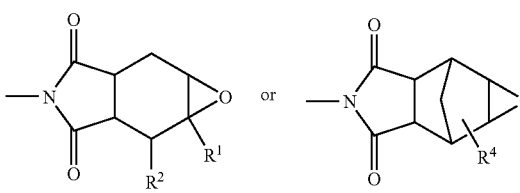

$R^1$ and $R^2$ each represent hydrogen, a C1-6 alkyl group or a C1-4 trialkylsilyl group, each $R^3$ may be the same or different and each independently represents hydrogen, alkyl, aryl, aralkyl, alkenyl or fluoroalkyl, $R^4$ represents hydrogen, a C1-6 alkyl group or a C1-4 trialkylsilyl group, and n is 0 or a positive integer).

2. An epoxy compound according to claim 1, wherein $R^1$ and $R^2$ are hydrogen, or $R^1$ is methyl, ethyl, propyl, isopropyl, tertiary butyl, trimethylsilyl, triethylsilyl or tertiary butyldimethylsilyl and $R^2$ is hydrogen, or $R^1$ is hydrogen and $R^2$ is methyl, ethyl, propyl, isopropyl, tertiary butyl, trimethylsilyl, triethylsilyl or tertiary butyldimethylsilyl.

3. An epoxy compound according to claim 1, wherein $R^4$ is hydrogen or $R^4$ is methyl, ethyl, propyl, isopropyl, tertiary butyl, trimethylsilyl, triethylsilyl or tertiary butyldimethylsilyl.

4. A process for production of an epoxy compound according to claim 1 or 2, characterized by reacting an olefin compound represented by the following general formula (II):

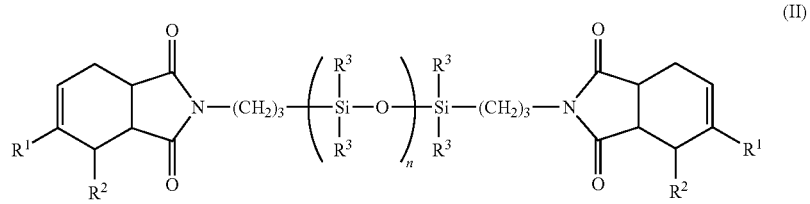

(II)

(wherein $R^1$, $R^2$, $R^3$ and n are as defined above) with a peroxide.

5. A production process according to claim 4, wherein in general formula (II), $R^1$ and $R^2$ are hydrogen, or $R^1$ is methyl, ethyl, propyl, isopropyl, tertiary butyl, trimethylsilyl, triethylsilyl or tertiary butyldimethylsilyl and $R^2$ is hydrogen, or $R^1$ is hydrogen and $R^2$ is methyl, ethyl, propyl, isopropyl, tertiary butyl, trimethylsilyl, triethylsilyl or tertiary butyldimethylsilyl.

6. A process for production of an epoxy compound according to claim 1 or 2, characterized by reacting an epoxy compound represented by the following general formula (III):

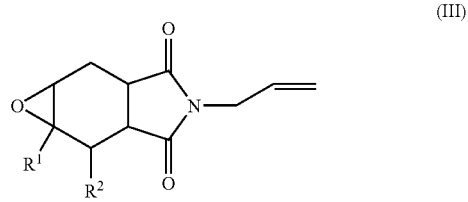

(III)

(wherein $R^1$ and $R^2$ are as defined above) with a silicon compound represented by the following general formula (IV):

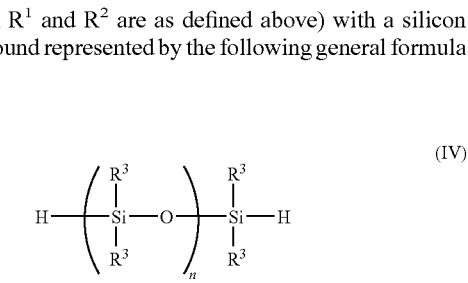

(IV)

(wherein $R^3$ and n are as defined above).

7. A production process according to claim 6, wherein in general formula (III), $R^1$ and $R^2$ are hydrogen, or $R^1$ is methyl, ethyl, propyl, isopropyl, tertiary butyl, trimethylsilyl, triethylsilyl or tertiary butyldimethylsilyl and $R^2$ is hydrogen, or $R^1$ is hydrogen and $R^2$ is methyl, ethyl, propyl, isopropyl, tertiary butyl, trimethylsilyl, triethylsilyl or tertiary butyldimethylsilyl.

8. A process for production of an epoxy compound according to claim 1 or 3, characterized by reacting an olefin compound represented by the following general formula (V):

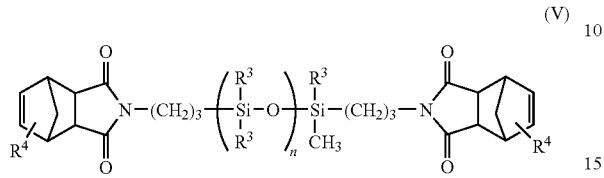

(V)

(wherein $R^3$, $R^4$ and n are as defined above) with a peroxide.

9. A production process according to claim 8, wherein in general formula (V), $R^4$ is hydrogen or $R^4$ is methyl, ethyl, propyl, isopropyl, tertiary butyl, trimethylsilyl, triethylsilyl or tertiary butyldimethylsilyl.

10. A process for production of an epoxy compound according to claim 1 or 3, characterized by reacting an epoxy compound represented by the following general formula (VI):

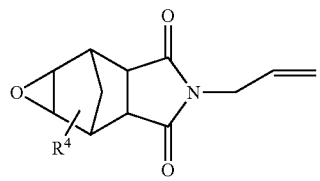

(VI)

(wherein $R^4$ is as defined above) with a silicon compound represented by the following general formula (IV):

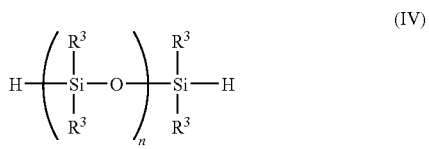

(IV)

(wherein $R^3$ and n are as defined above).

11. A production process according to claim 10, wherein in general formula (VI), $R^4$ is hydrogen or $R^4$ is methyl, ethyl, propyl, isopropyl, tertiary butyl, trimethylsilyl, triethylsilyl or tertiary butyldimethylsilyl.

* * * * *